(12) United States Patent
Chen et al.

(10) Patent No.: US 9,798,065 B2
(45) Date of Patent: Oct. 24, 2017

(54) LIGHT GUIDE PLATE AND BACKLIGHT MODULE USING THE LIGHT GUIDE PLATE

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Lingyan Chen, Guangdong (CN); Yanxue Zhang, Guangdong (CN); Zhongjie Liu, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 95 days.

(21) Appl. No.: 14/764,602

(22) PCT Filed: Jun. 2, 2015

(86) PCT No.: PCT/CN2015/080596
§ 371 (c)(1),
(2) Date: Jul. 30, 2015

(87) PCT Pub. No.: WO2016/173085
PCT Pub. Date: Nov. 3, 2016

(65) Prior Publication Data
US 2016/0320544 A1    Nov. 3, 2016

(30) Foreign Application Priority Data

Apr. 28, 2015 (CN) .......................... 2015 1 0209598

(51) Int. Cl.
F21V 7/04 (2006.01)
F21V 8/00 (2006.01)

(52) U.S. Cl.
CPC .................................. *G02B 6/0038* (2013.01)

(58) Field of Classification Search
CPC ..................................................... G02B 6/0038
(Continued)

(56) References Cited

U.S. PATENT DOCUMENTS

2006/0034099 A1* 2/2006 Yang et al. .................... 362/615
2010/0027293 A1* 2/2010 Li ........................... G02B 6/002
362/619

FOREIGN PATENT DOCUMENTS

CN        200976055 Y  * 11/2007
JP        2005259673 A  *  9/2005

OTHER PUBLICATIONS

Machine English Translationof CN200976055Y, Nov. 2007, Zhang Qinghui.*

* cited by examiner

*Primary Examiner* — Elmito Breval
*Assistant Examiner* — Glenn Zimmerman
(74) *Attorney, Agent, or Firm* — Andrew C. Cheng

(57) ABSTRACT

The disclosure is related to a light guide plate having a light-emitting surface, wherein a plurality of V-shaped grooves is formed on the light-emitting surface; each of the V-shaped grooves extends along a curved path. The V-shaped grooves of the light guide plate extend along the curved path to avoid the light guide plate from collecting light in a single direction. The interference fringes of the light guide plate are reduced, thereby improving the uniformity of light emission of the light guide plate.

6 Claims, 5 Drawing Sheets

(58) Field of Classification Search
USPC .................. 362/611, 620, 97.1, 97.2, 97.3
See application file for complete search history.

LIGHT GUIDE PLATE AND BACKLIGHT MODULE USING THE LIGHT GUIDE PLATE

CROSS REFERENCE TO RELATED APPLICATIONS

This application claims the priority of Chinese Patent Application No. 201510209598.X, entitled "Light Guide Plate And Backlight Module Using The Light Guide Plate", filed on Apr. 28, 2015, the disclosure of which is incorporated herein by reference in its entirety.

BACKGROUND OF THE INVENTION

Technical Field

The disclosure is related to the technology field of the liquid crystal display, and more particular to a light guide plate and the backlight module using the light guide plate.

Related Art

LCD display itself cannot emit light. A backlight module is required as the light source of the liquid crystal display. The light guide plate is an important component in the backlight module and is used to guide the transmission direction of the light beam emitted from the light source to transform the linear light source or the point light source as a surface light source for emitting. The light guide plate uses the principle of the total reflection of the light at the transparent interface to deflect 90° for the incident light at the end surface and then emit the light.

In order to guide the total reflected light in the light guide plate from the working surface of the light guide plate, some microstructures need to be engraved on the light guide plate such that the light is scattered upon encountering to the microstructures to obtain a uniform light having a certain extent of brightness for outputting.

To further improve the panel luminance and energy savings, modular V-cut technology emerges accordingly. As shown in FIG. 1 and FIG. 2, the microstructures of V-shaped grooves 11 are formed on the surface of the light guide plate 1. The advantages of such light guide plates are that the light may be effectively guided and have a certain convergence effect for facilitating increase on the light usage. The brightness may be increased and the backlight module may be thin.

However, in the current modular V-cut technology, the microstructures of V-shaped grooves are formed in a straight-stripped form such that the light guide plate has better effects for light collecting in a signal direction. When the light passes through the light guide plate, the interference fringes easily occur and the uniformity is worse.

SUMMARY OF THE INVENTION

The purpose of the present disclosure is to provide a light guide plate having better uniformity.

In order to solve the above technical problem, the embodiment of the disclosure provides a light guide plate having light-emitting surface, wherein a plurality of V-shaped grooves is formed on the light-emitting surface; each of the V-shaped grooves extends along a curved path.

In one embodiment, the curved path is arc-shaped; the light emitting surface comprises a light source near part and a light source far part; the V-shaped grooves are arranged one by one from the light source near part of the light emitting surface to the light source far part of the light emitting surface and the light source near part of the light emitting surface is arranged at the concave side of the curved path of each V-shaped groove.

In one embodiment, the distance between two adjacent V-shaped grooves decreases gradually from the light source near part of the light-emitting surface to the light source far part of the light-emitting surface.

In one embodiment, the center of the curved path of each V-shaped groove is located on the same line.

In one embodiment, the curved path of the first V-shaped groove comprises at least two arc segments connecting successively from the light source near part of the light emitting surface to the light source far part of the light emitting surface.

In one embodiment, the curved path of the first V-shaped groove comprises a first arc, a second arc and a third arc connecting successively; the first arc and the third arc are symmetrical in respect to the line, and the second arc is self symmetrical in respect to the line.

In one embodiment, the curved path is wave-shaped; the plurality of the V-shaped grooves comprises a first V-shaped groove and a second V-shaped groove; the first V-shaped groove extends from the light source near part of the light emitting surface to the light source far part of the light emitting surface; the extending direction of the second V-shaped groove is perpendicular to the extending direction of the first V-shaped groove; the second V-shaped groove is close to the light source near part of the light emitting surface.

In one embodiment, the curved path is a sinusoidal waveform, a triangle waveform, a sawtooth waveform or a rectangular waveform.

In one embodiment, the curved path of the first V-shaped groove is fracture-like.

The embodiment of the disclosure further provides a backlight module comprising the light guide plates mentioned above and a light source assembly arranged opposite to the light source near part of the light guide plate.

The light guide plates and the backlight modules of the embodiments of the disclosure have the following beneficial effects. The V-shaped grooves of the light guide plate of the embodiments of the disclosure extend along the curved path to avoid the light guide plate from collecting light in a single direction. The interference fringes of the light guide plate are reduced, thereby improving the uniformity of light emission of the light guide plate.

BRIEF DESCRIPTION OF THE DRAWINGS

In order to more clearly illustrate the embodiments the disclosure, the accompanying drawings for illustrating the embodiments of the disclosure are briefly described as below. It is apparently that the drawings described below are merely some embodiments of the disclosure, and those skilled in the art may derive other drawings according the drawings described below without creative endeavor.

DETAILED DESCRIPTION OF THE PREFERRED EMBODIMENTS

The following description with reference to the accompanying drawings is provided to clearly and thoroughly explain the exemplary embodiments of the disclosure.

Refer to FIG. 3 to FIG. 6. The embodiments of the disclosure provide a light guide plate 100. The light guide plate 100 comprises a light-emitting surface 110. A plurality of V-shaped grooves 120 is formed on the light-emitting surface 110. The V-shaped grooves 120 of the light guide plate of the disclosure extend along the curved path to avoid the light guide plate 100 from collecting light in a single direction. The interference fringes of the light guide plate 100 are reduced, thereby improving the uniformity of light emission of the light guide plate 100.

Figure 1:
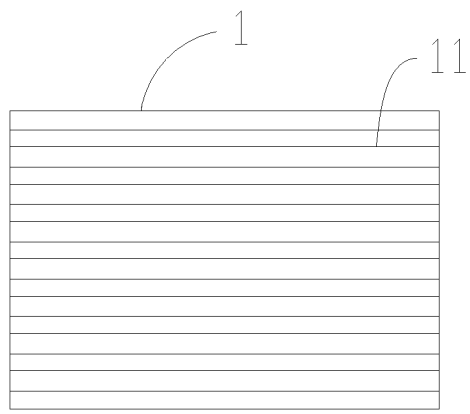
FIG. 1 is the schematic diagram of the light guide plate of the prior art.
Figure 2:
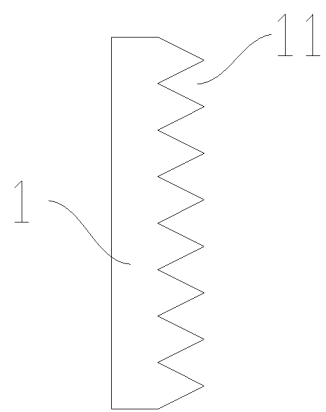
FIG. 2 is the sectional view of the light guide plate of FIG. 1.
Figure 3:
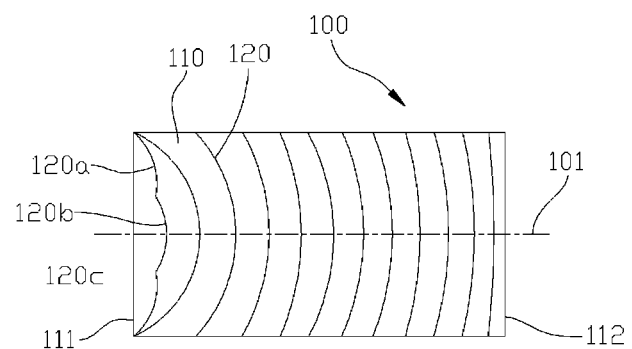
FIG. 3 is the schematic diagram of the first embodiment of the light guide plate of the disclosure.

Further refer to FIG. 3. The curved path is arc-shaped. The light emitting surface 110 comprises a light source near part 111 and a light source far part 112. The V-shaped grooves 120 are arranged one by one from the light source near part 111 of the light-emitting surface to the light source far part 112 of the light emitting surface and the light source near part 111 of the light-emitting surface is arranged at the concave side of the curved path of each V-shaped groove 120.

In one embodiment, the distance between two adjacent V-shaped grooves 120 decreases gradually from the light source near part 111 of the light emitting surface to the light source far part 112 of the light emitting surface. The arrangement of the V-shaped grooves 120 close to the light source near part 111 is sparse to prevent the occurrence of the hotspot phenomenon. The arrangement of the V-shaped grooves 120 far from the light source near part 111 is dense to increase the brightness of the light emitting regions of far from the light source near part 111.

In one embodiment, the center of the curved path of each V-shaped groove 120 is located on the same line 101. Furthermore, each V-shaped groove 120 is symmetrical in respect to the line 101. Adoption of the symmetric V-shaped groove 120 enables the light emitting regions at the two sides of the line 101 to have the same light emitting effects to further increase the luminescent uniformity of the embodiment of the disclosure.

In one embodiment, the curved path of the first V-shaped groove 120 comprises at least two arc segments connecting successively from the light source near part 111 of the light emitting surface to the light source far part 112 of the light emitting surface.

In one embodiment, the curved path of the first V-shaped groove 120 comprises a first arc 120a, a second arc 120b and a third arc 120c connecting successively. The first arc 102a and the third arc 120c are symmetrical in respect to the line 101, and the second arc 120b is self-symmetrical in respect to the line 101. The first V-shaped groove 120 is configured to have three arcs to further prevent the occurrence of the hotspot phenomenon of the light source near part 111.

Figure 4:
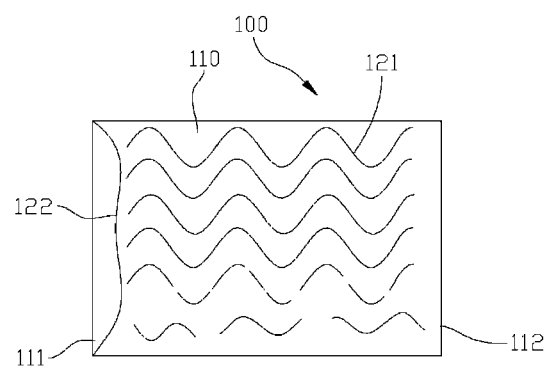
FIG. 4 is the schematic diagram of the second embodiment of the light guide plate of the disclosure.
Figure 5:
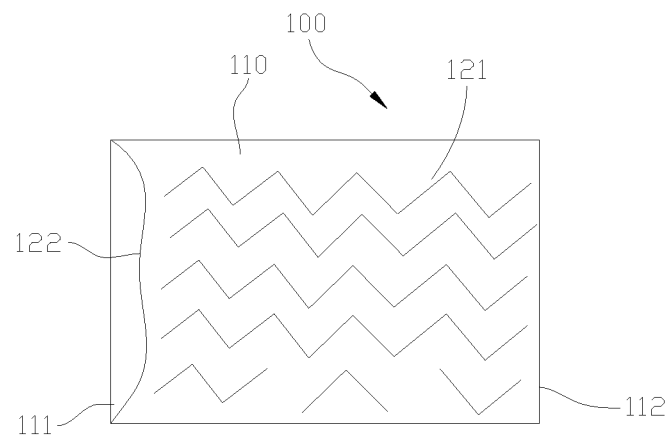
FIG. 5 is the schematic diagram of the third embodiment of the light guide plate of the disclosure.
Figure 6:
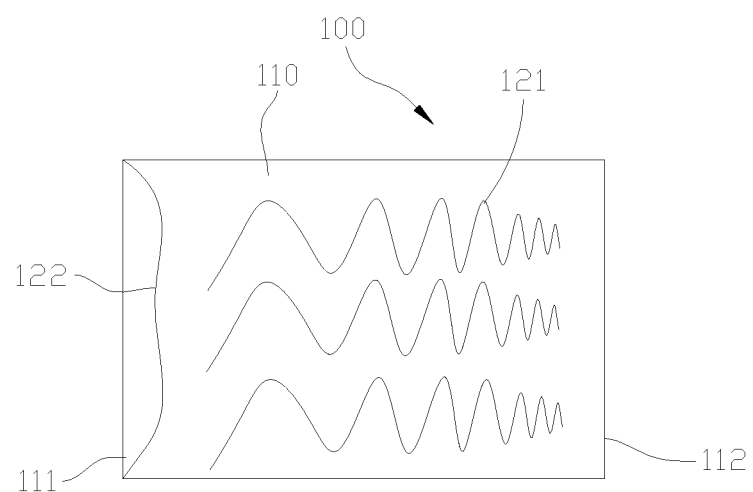
FIG. 6 is the schematic diagram of the fourth embodiment of the light guide plate of the disclosure.
Figure 7:
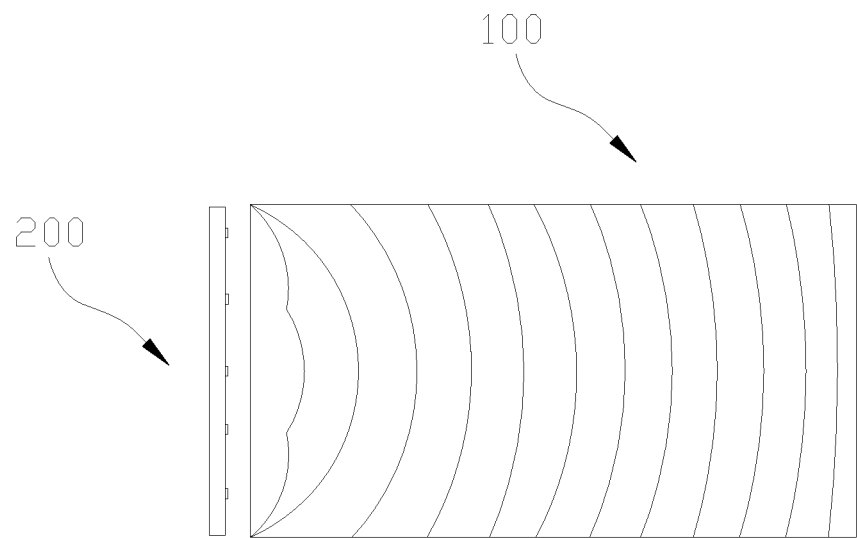
FIG. 7 is the schematic diagram of the first embodiment of the backlight module of the disclosure.
Figure 8:
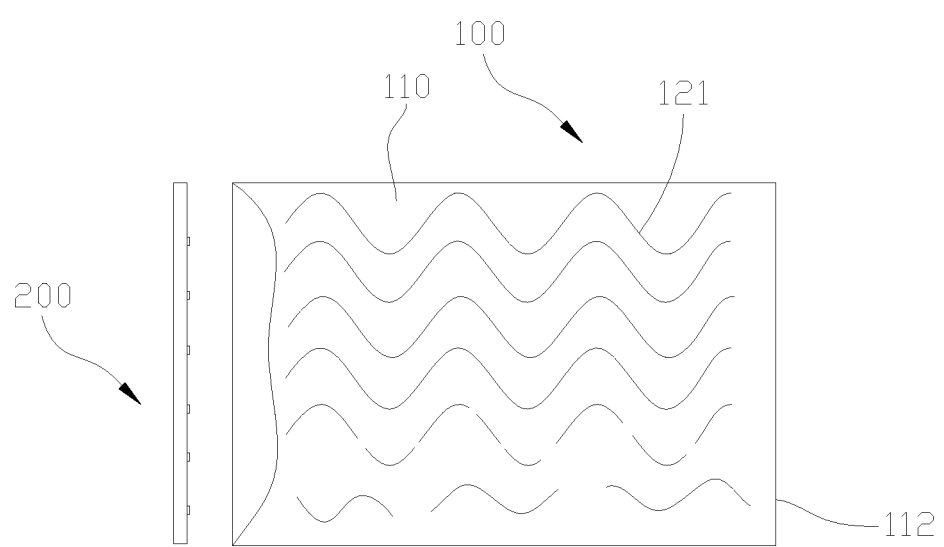
FIG. 8 is the schematic diagram of the second embodiment of the backlight module of the disclosure.
Figure 9:
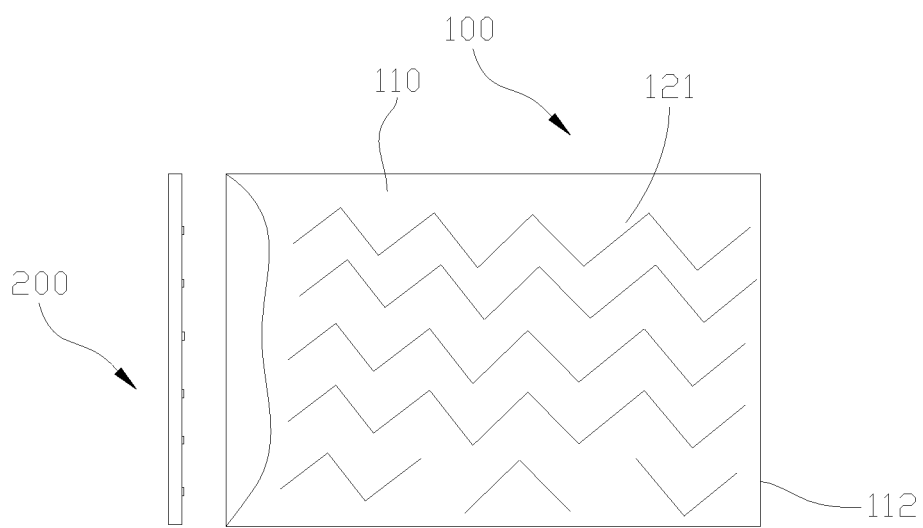
FIG. 9 is the schematic diagram of the third embodiment of the backlight module of the disclosure.
Figure 10:
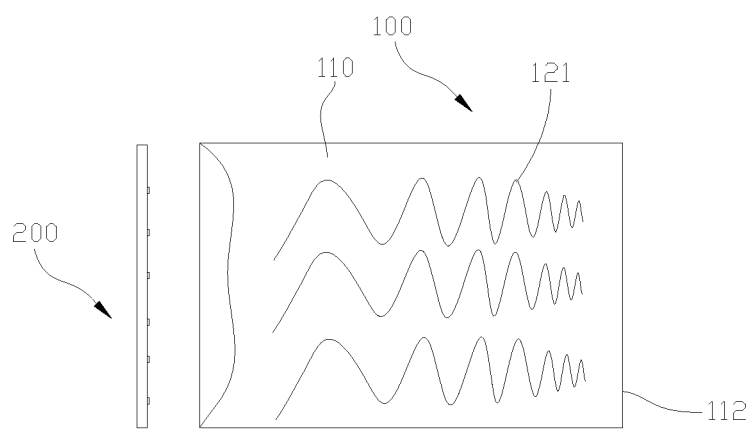
FIG. 10 is the schematic diagram of the fourth embodiment of the backlight module of the disclosure.

Further refer to FIG. 4 to FIG. 6. The curved path is wave-shaped. The plurality of the V-shaped grooves comprises a first V-shaped groove 121 and a second V-shaped groove 122. The first V-shaped groove 121 extends from the light source near part 111 of the light emitting surface 110 to the light source far part 112 of the light emitting surface 110. The extending direction of the second V-shaped groove 122 is perpendicular to the extending direction of the first V-shaped groove 121. The second V-shaped groove 122 is close to the light source near part 111 of the light-emitting surface 110.

In one embodiment, the curved path is a sinusoidal waveform, a triangle waveform, a sawtooth waveform or a rectangular waveform.

In one embodiment, the curved path of the first V-shaped groove 121 is fracture-like or is in a continuous form.

Furthermore, the wavelength of the curved path of the first V-shaped grooves 120 gradually reduces from the light source near part 111 to the light source far part 122. The arrangement of the V-shaped grooves 120 close to the light source near part 111 is sparse to prevent the occurrence of the hotspot phenomenon. The arrangement of the V-shaped grooves 120 far from the light source near part 111 is dense to increase the brightness of the light emitting regions of far from the light source near part 111.

Furthermore, the embodiment of the disclosure provides a backlight module comprises the light guide plate 100 as mentioned above and a light source assembly 200 arranged opposite to the light source near part 111 of the light guide plate 100.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A light guide plate comprising a light-emitting surface, wherein a plurality of V-shaped grooves is formed on the light-emitting surface; each of the V-shaped grooves extends along a curved path, wherein the curved path is arc-shaped; the light emitting surface comprises a light source near part and a light source far part; the V-shaped grooves are arranged one by one from the light source near part of the light emitting surface to the light source far part of the light emitting surface and the light source near part of the light emitting surface is arranged at the concave side of the curved path of each V-shaped groove, wherein the distance between two adjacent V-shaped grooves decreases gradually from the light source near part of the light-emitting surface to the light source far part of the light-emitting surface; and wherein the curved path of the first V-shaped groove comprises at least two arc segments connecting successively from the light source near part of the light emitting surface to the light source far part of the light emitting surface.

2. The light guide plate according to claim 1, wherein the center of the curved path of each V-shaped groove is located on the same line.

3. The light guide plate according to claim 2, wherein the curved path of the first V-shaped groove comprises at least two arc segments connecting successively from the light source near part of the light emitting surface to the light source far part of the light emitting surface.

4. The light guide plate according to claim 2, wherein the curved path of the first V-shaped groove comprises a first arc, a second arc and a third arc connecting successively; the first arc and the third arc are symmetrical in respect to the line, and the second arc is self symmetrical in respect to the line.

5. A light guide plate comprising a light-emitting surface, wherein a plurality of V-shaped grooves is formed on the light-emitting surface; each of the V-shaped grooves extends along a curved path, wherein the curved path is arc-shaped; the light emitting surface comprises a light source near part and a light source far part; the V-shaped grooves are arranged one by one from the light source near part of the light emitting surface to the light source far part of the light emitting surface and the light source near part of the light emitting surface is arranged at the concave side of the curved path of each V-shaped groove, wherein the curved path of the first V-shaped groove comprises at least two arc segments connecting successively from the light source near part of the light emitting surface to the light source far part of the light emitting surface.

6. A light guide plate comprising a light-emitting surface, wherein a plurality of V-shaped grooves is formed on the light-emitting surface; each of the V-shaped grooves extends along a curved path, wherein the curved path is arc-shaped; the light emitting surface comprises a light source near part and a light source far part; the V-shaped grooves are arranged one by one from the light source near part of the light emitting surface to the light source far part of the light emitting surface and the light source near part of the light emitting surface is arranged at the concave side of the curved path of each V-shaped groove, wherein the center of the curved path of each V-shaped groove is located on the same line, wherein the curved path of the first V-shaped groove comprises at least two arc segments connecting successively from the light source near part of the light emitting surface to the light source far part of the light emitting surface.

* * * * *